United States Patent [19]

Baiatu

[11] Patent Number: 5,796,568
[45] Date of Patent: Aug. 18, 1998

[54] CURRENT LIMITER DEVICE

[75] Inventor: Tudor Baiatu, Brugg, Switzerland

[73] Assignee: Asea Brown Boveri AG, Baden, Switzerland

[21] Appl. No.: 822,208

[22] Filed: Mar. 20, 1997

Related U.S. Application Data

[63] Continuation of Ser. No. 553,031, Nov. 3, 1995.

[30] Foreign Application Priority Data

Nov. 19, 1994 [DE] Germany .................. 44 41 279.7

[51] Int. Cl.$^6$ ............................................ H02H 5/04
[52] U.S. Cl. .................. 361/106; 361/58; 361/111; 338/55; 338/22 R
[58] Field of Search ................ 361/25, 27, 56, 361/58, 103, 106, 119, 114, 124, 126, 127; 338/53–55, 61–63, 20–22 R, 99

[56] References Cited

U.S. PATENT DOCUMENTS

| | | | |
|---|---|---|---|
| 3,654,580 | 4/1972 | Laisi | 338/61 |
| 3,996,447 | 12/1976 | Bouffard et al. | |
| 4,271,446 | 6/1981 | Comstock | 361/56 |
| 4,420,739 | 12/1983 | Herren | 338/53 |
| 4,816,958 | 3/1989 | Belbel et al. | 361/93 |
| 5,296,996 | 3/1994 | Hansson et al. | 361/106 |

FOREIGN PATENT DOCUMENTS

| | | | |
|---|---|---|---|
| 2 206 610 | 6/1974 | France | H02H 7/12 |
| 2 348 614 | 11/1977 | France | H05B 1/02 |
| 2 606 929 | 5/1988 | France | H01H 9/54 |
| 3710799A1 | 11/1987 | Germany | G01R 31/02 |
| 9100865.4 | 4/1991 | Germany | H01C 1/08 |
| 4441279C1 | 9/1995 | Germany | H02H 9/02 |
| 581377 | 9/1976 | Switzerland | H01G 7/02 |
| 294549 | 1/1930 | United Kingdom. | |

OTHER PUBLICATIONS

"Thermally Conductive Aluminium Nitride–Filled Epoxy Resin", Bujard and Ansermet, Fifth IEEE Semi–Therm Symposium, 1989, pp. 126–130 No Month.

*Primary Examiner*—Ronald W. Leja
*Attorney, Agent, or Firm*—Burns, Doane, Swecker & Mathis, L.L.P.

[57] ABSTRACT

A reversible short circuit current limiter which has at least one PTC thermistor connected in parallel with a shunt impedance branch, and is connected in series with at least one capacitor or a capacitor bank of the DC intermediate circuit. The short circuit current limiter may be arranged in the DC intermediate circuit or in the current convertor. A diode may be connected in the reverse-bias direction of a short circuit path in parallel with the PTC thermistor. The shunt impedance branch has a varistor connected in series with an ohmic resistor or a PTC thermistor and, if appropriate, an inductor. Structures of metal-based non-blocking PTC thermistors are specified.

15 Claims, 4 Drawing Sheets

CURRENT LIMITER DEVICE

This application is a continuation of application Ser. No. 08/553,031, filed Nov. 3, 1995.

BACKGROUND OF THE INVENTION

1. Field of the Invention

The invention relates generally to a current limiter device having a PTC thermistor and a varistor. The invention also relates to a use of the current limiter device.

2. Discussion of Background

To provide arc-free quenching, U.S. Pat. No. 4,583,146 discloses a PTC thermistor and a varistor are connected in parallel branches to a mechanical breaker contact. The PTC thermistor may have a thin varistor layer at the end. When the mechanical switch is opened, the current switches from the latter to the PTC thermistor and varistor.

In circuits without a breaker contact, the dynamic response of such a current limiter circuit is unsatisfactory.

CH-A-581 377 discloses the connection of a PTC thermistor in parallel with a fixed-value resistor and with a thermally or magnetically trippable first switch. A second, voltage build-up switch is being provided in series with this parallel circuit. The PTC thermistor is loaded only in the event of short circuit, in which case it increases its resistance and allows substantially load-free switching of the second switch. Instead of one PTC thermistor, a plurality of different PTC thermistors which respond one after the other may be connected in parallel.

The paper by P. Bujard and J. P. Ansermet, "Thermally conductive aluminium nitride-filled epoxy" in: 5th IEEE semi-therm Symposium (1989), pp. 126–130, discloses how to achieve a filling ratio of 62 vol % in the case of an aluminium nitride (AlN) filled polymer matrix as is suitable for the production of PTC thermistors.

For current convertors which have a DC intermediate circuit, very large short circuit currents can occur in the intermediate circuit as a result of low-impedance discharging of the intermediat-circuit capacitors. These currents can lead to the destruction of active components in the absence of protective measures, and stress and deform structural parts with large forces.

DE 3 710 799 A1 discloses, an invertor circuit having a fuse connected in series with capacitors. The fuse melts and breaks the circuit if a DC capacitor is short circuited. A time period of, for example, a few hundredths of ms elapses from the time when the lines of the invertor circuit are short circuited before a detector, which responds to melting of the fuse, detects this short circuit. Only an internal short circuit of a DC capacitor is detected. The associated instruments and circuits are thereby protected in the event of an internal short circuit of a capacitor. Instead of the fuse, a differential amplifier, which detects a fault by means of a potential difference, may also be provided for groups of series-connected DC capacitors.

For traction current convertors, which are exposed to increased vibrational and impact stresses, conventional fuses have low reliability and are not desirable to railroad operators. Fuses are large components requiring a great deal of wiring, which build up high back-emfs and interfere with operation of current convertors having switchable semiconductors. Required responses of less than 100 µs are difficult, if not impossible, to obtain.

A considerable reduction in, or elimination of, the intermediate-circuit inductance is desirable for current convertor operation. However, in the absence of protective measures, the short circuit current strengths are thereby increased in the event of short circuit to values of up to 1 MA which cannot at present be mechanically kept under control in traction systems using current convertors.

SUMMARY OF THE INVENTION

Accordingly, one object of the invention is to provide a current limiter device such that short circuit currents can be limited within 10 µs to values which are below the destruction limit of passive components of the electrical systems or circuits to be protected.

The protective device of the present invention works reversibly, responds without arcing, can be used in low-induction form, and saves space. The protective circuit is low-loss, vibration-resistant and can be integrated in an existing cooling circuit; it responds autonomously and permits flexible application. The reliability of the protective system is not detrimentally influenced by additional electronic modules and components.

If the current limiter circuit is used connected in series with current convertor valves, then an inductor for limiting current rise can be obviated.

According to an advantageous configuration of the invention, short circuit currents can be limited within 10 µs to values which are below the destruction limit of active components of the electrical systems or circuits to be protected. In this case cooling of the active part of the current limiter devices is essential. If a liquid cooling system is already present, this cooling can be integrated into its cooling circuit.

According to an advantageous configuration of the invention, by matching the dimension of the active part of the PTC thermistors, the short circuit response of the protective circuits can be matched flexibly to the different electrical characteristics of various types of current convertors.

With the protection according to the invention it is possible to decouple the energy of a capacitor bank, internally stored in a current convertor, from a short circuit in the current convertor circuits or semiconductors. In this case, the current limiter device can be arranged either in the DC intermediate circuit or in the phase components. Because of the modular nature of the intermediate-circuit capacitor battery which, if appropriate, has up to 40 capacitors connected in parallel, the short circuit protection can be selectively arranged on one or more capacitors connected in parallel.

BRIEF DESCRIPTION OF THE DRAWINGS

A more complete appreciation of the invention and many of the attendant advantages thereof will be readily obtained by reference to the following detailed description accompanying drawings, wherein.

DESCRIPTION OF THE PREFERRED EMBODIMENTS

Figure 1:
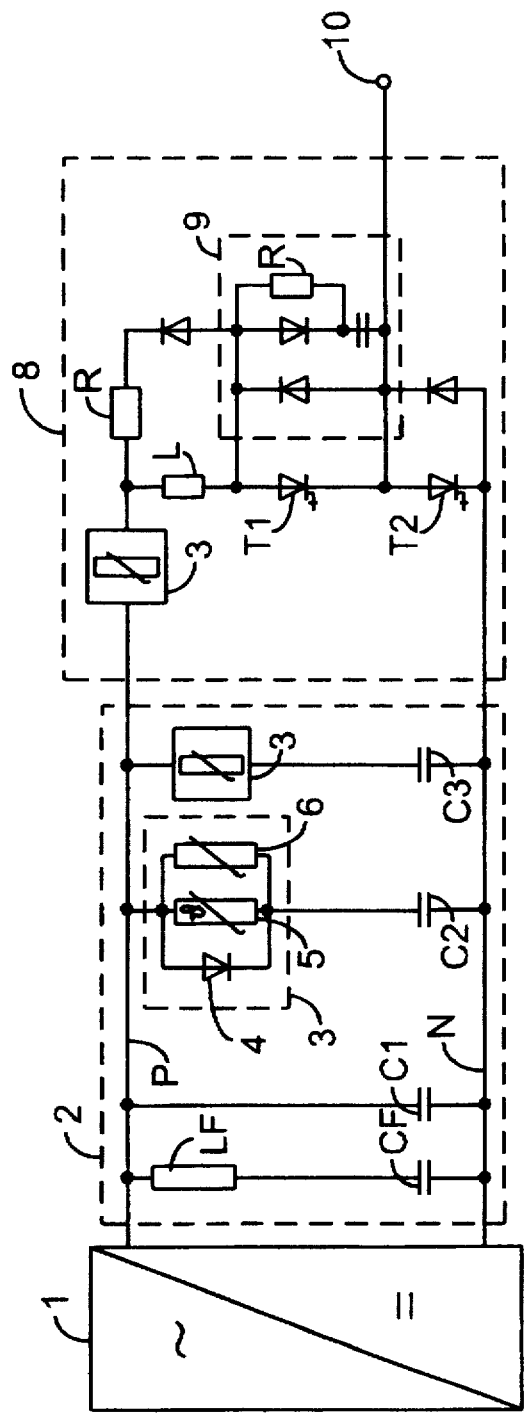
FIG. 1 shows a two-point current convertor circuit having a drive current convertor connected via a DC intermediate circuit to a line current convertor, and a reversible current limiter being arranged in the short circuit path of the capacitors of the DC intermediate circuit.

Referring now to the drawings, wherein like reference numerals designate identical or corresponding parts throughout the several views, FIG. 1 shows a line current convertor or first current convertor (1) which is electrically connected on the DC side via a DC intermediate circuit (2) to a drive current convertor or second current convertor (8).

The DC intermediate circuit (2) has, between a positive pole or positive pole plate (P) and a negative pole or a negative pole plate (N), a filter, for damping intermediate circuit harmonics. The filter includes a filtering inductor (LF) and a filtering capacitor (CF) connected in series. It also has intermediate-circuit capacitors or capacitors (C1, C2, C3), where capacitors (C2, C3) are each connected in series with a reversible short circuit current limiter (3). The reversible short circuit current limiter (3) has, connected in parallel, a diode (4) connected in the reverse-bias direction of a short circuit path, a PTC thermistor (5) and a shunt impedance branch (6) containing a surge voltage protector or varistor (7) (cf. FIGS. 3–5). The PTC thermistor (5) and the shunt impedance branch (6) are always present in the short circuit current limiter (3), while the diode (4) may be connected in parallel.

The two current convertors (1, 8) are designed as two-point current convertors. Only two main valve branches having two GTO thyristors (T1, T2) as main valves for an AC phase, which can be tapped at an AC voltage terminal (10), are shown in FIG. 1 for the current convertor (8). Six similarly designed main valve branches are correspondingly required for three-phase AC. A thyristor circuit (9) is provided in parallel with each main valve (T1, T2), but only the one in parallel with the GTO thyristor (T1) is represented for the sake of clarity. The the thyristor circuit (9) could also be connected in a manner other than that represented. An inductor or di/dt limiter inductor (L) is connected via a reversible short circuit current limiter (3) to the positive pole (P) of the DC intermediate circuit (2) in the current path of the two main valves (T1, T2). A diode having an ohmic resistor in series is connected in a branch in parallel with the di/dt limiter inductor (L). This di/dt limiter inductor (L) may be kept very small or obviated when using the short circuit current limiter (3) according to the invention.

The reversible short circuit current limiter (3) in the second current convertor (8) can be obviated if reversible short circuit current limiters (3) are provided in the DC intermediate circuit (2). Moreover, the reversible short circuit current limiters (3) in the DC intermediate circuit (2) can be obviated if a reversible short circuit current limiter (3) is provided in the second current convertor (8).

Figure 2:
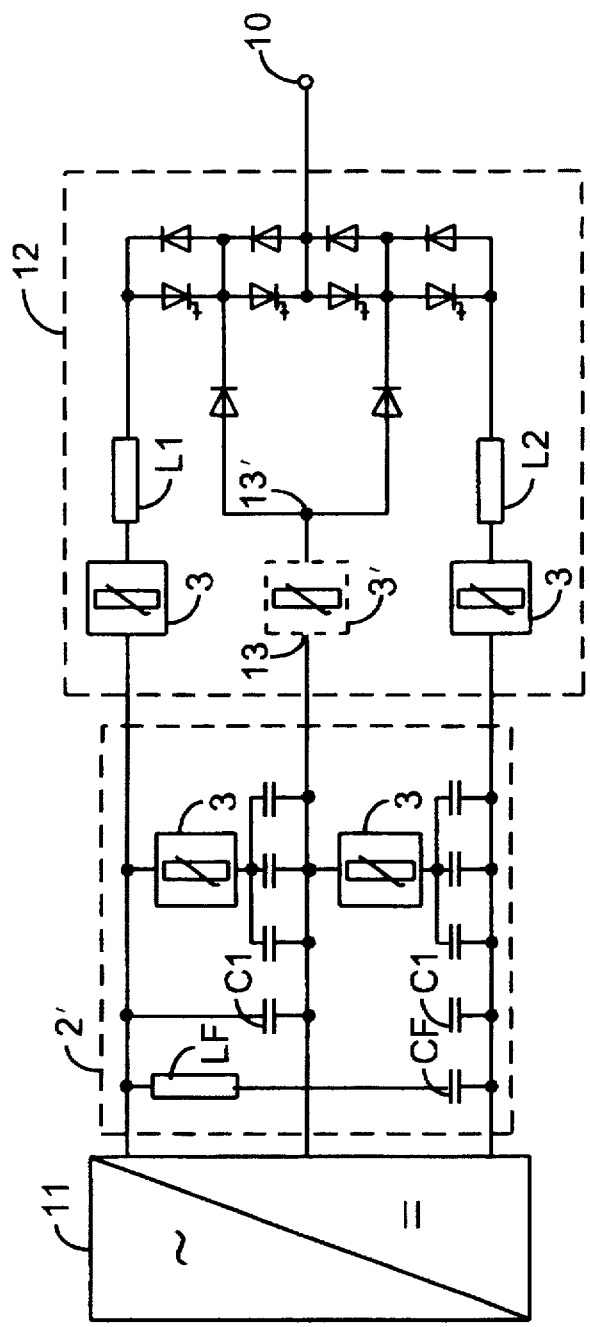
FIG. 2 shows a current convertor circuit according to FIG. 1, having three-point current convertors.

FIG. 2 shows, as a second exemplary embodiment, a current convertor circuit similar to FIG. 1 but having three-point current convertors (11, 12) instead of two-point current convertors (1, 8). In a DC intermediate circuit (2'), a reversible short circuit current limiter (3) is connected in series for each potential half with a capacitor bank which has a plurality of capacitors connected in parallel. The advantage of this circuit consists in a cost reduction of the protective circuit, since fewer reversible short circuit current limiters (3, 3') are necessary, or in a reduced system diversification, since fewer types of reversible short circuit current limiters (3, 3') are required for the range of current convertors.

In the case of the three-point current convertor (12) di/dt limiter inductors (L1, L2), which are electrically connected to the positive pole (P) or to the negative pole (N) of the DC intermediate circuit (2'), are connected in series with the main valves of each main valve branch. These inductors may be very small or may be left out. A reversible short circuit current limiter (3') (represented in broken lines), which is electrically connected, on the one hand, to a neutral conductor (13') of the neutral path and, on the other hand, to a neutral conductor (13) of the DC intermediate circuit (2'), may be provided, instead of the two reversible short circuit current limiters (3), in this zero-point- or neutral path of the current convertor (12). This produces sufficient protection for many cases of malfunction. It is clear that, in the case of this exemplary embodiment as well, the reversible short circuit current limiters (3, 3') in the second current convertor (12) can be obviated if reversible short circuit current limiters (3) in the DC intermediate circuit (2') guarantee the desired protection, and vice versa.

It is important that a reversible short circuit current limiter (3, 3') is provided in the short circuit current path of at least one intermediat-circuit capacitor (C2, C3). The result of this is that possible short circuit discharge currents of the capacitors (C2, C3) are limited to values which are at least below the destruction limit of the passive components and of the conductor rails, and ideally below the destruction limit of the active components. The protective circuit response times required for this are less than 10 μs.

The protective circuits according to FIGS. 1 and 2 guarantee good protection both in the case of a partial short circuit and in the case of a full short circuit of a current convertor (1, 8; 11, 12).

By virtue of the fact that a diode (4) is connected in parallel with a PTC thermistor (5), the thermal continuous-current loading of the reversible short circuit current limiters (3, 3') can be reduced. During operation under rated conditions, the diode (4) is forward biased for one half period of the intermediate circuit pulse frequency and thus reduces the RMS current. In the event of a short circuit, the diode (4) is reverse biased and the protective function of the reversible short circuit current limiter (3, 3') is fully effective.

If one or more intermediate-circuit capacitors (C1) are left without reversible short circuit current limiters (3), while the remaining intermediate-circuit capacitors (C2, C3) have one, then protection against switch-off surge voltages is achieved. However, the short circuit current magnitude of the total current in the DC intermediate circuit increases proportionately.

Figure 3:
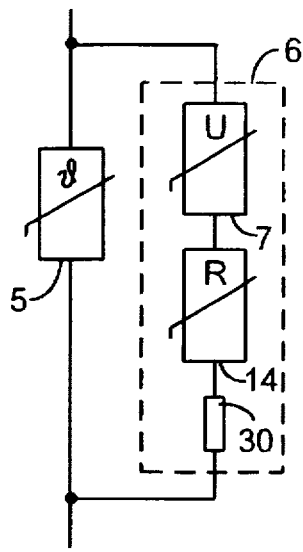
FIGS. 3–5 show various current limiter circuits having PTC thermistors, varistors and inductors.

FIG. 3 shows a short circuit current limiter (3) in which a shunt impedance branch (6) having a varistor (7), an ohmic resistor (14) and an inductor (30) connected in series is connected in parallel with a PTC thermistor (5) in a first or main current path. In the event of a fault or short circuit, the PTC thermistor (5) heats up to above its response temperature, so that its resistance rises greatly and limits the current. Thermal destruction of the PTC thermistor (5) is avoided by switching the short circuit current to the shunt impedance branch (6). In this case the short circuit current is limited to values which are not harmful to the DC intermediate circuit (2). After discharge of the capacitors (C2, C3) connected in series with the short circuit current limiter (3) and disconnection of the first current convertor (1) from a supplying energy source (not represented), the PTC thermistor (5) cools and is again ready for operation.

The PTC thermistor (5) may be a non blocking PTC thermistor based on metal, having resistance jumps to approximately 10 times, preferably less than 100 times its cold resistance, or a blocking PTC thermistor based on filled polymers, which have resistance jumps to more than 100 times, preferably to more than $10^4$ times the cold resistance.

The use of a varistor (7), preferably based on metal oxide, whose highest permissible continuous-operation voltage is preferably below the operating voltage of the DC intermediate circuit (2) is essential for the circuit according to FIG. 3. The ohmic resistor (14) connected in series with the varistor (7) improves the current limiting response of the circuit.

Figure 4:
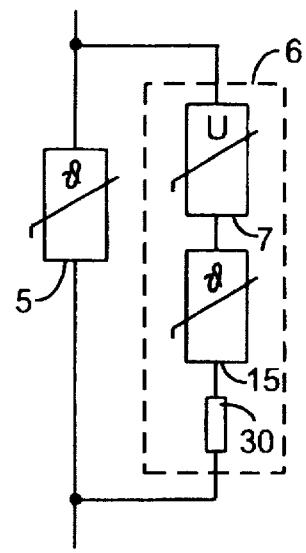

A PTC thermistor (15), which is blocking or non blocking at the operating voltage, may be used according to FIG. 4 instead of the ohmic resistor (14) according to FIG. 3. This leads to an improved current limiting response of the short circuit current limiter (3). If both PTC thermistors (5, 15) have a resistance/temperature characteristic with high resistance jumps to resistances which are considerably greater than 100 times, preferably greater than $10^4$ times the cold resistance (blocking PTC thermistor (5)), then a current-blocking response of the total circuit can be achieved. It is thereby possible to use the short circuit current limiter (3) as a protective element in electrical power distribution systems or networks in which voltages are applied to the short circuit current limiter (3) for a relatively long period of time.

Figure 5:
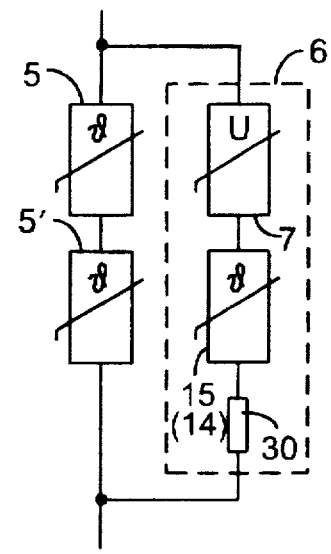

The short circuit current limiter (3) according to FIG. 5 differs from the one of FIG. 4 in that a non blocking PTC thermistor (5) is connected in series with a blocking PTC thermistor (5') in the main current path. In this case the blocking PTC thermistor (5') is configured in such a way that its resistance increases only after the non blocking PTC thermistor (5) has responded, i.e. that it responds with a time delay, cf. e.g. CH-A 581 377 mentioned at the start. As a result of this, the PTC thermistor (5') is electrically and thermally unloaded. In the shunt impedance branch (6), the PTC thermistor (15) can be replaced by an ohmic resistor (14) according to FIG. 3. In both cases, the circuit according to FIG. 5 is also suitable for protecting under overload conditions, the varistor (7) remaining in the blocking state. The continuous operation voltage of the varistor (7) must in this case be higher than the operating voltage of the DC intermediate circuit (2).

If a high rated current carrying capacity of a few 100 A, with short response time in the event of short circuit and with small overall volume of the short circuit current limiter (3), is required, at least the PTC thermistors (5, 5') of the short circuit current limiter (3) need to be cooled. For high power current convertors having an existing liquid cooling system, the cooling can be integrated into the cooling circuit. The total losses of the protective device are insignificant for the loss balance of the current convertor (1, 8; 11, 12).

By virtue of the inductor (30), preferably provided in the shunt impedance branch (6), an improvement of the current limiting response of the total circuit can be achieved.

Figure 6A:
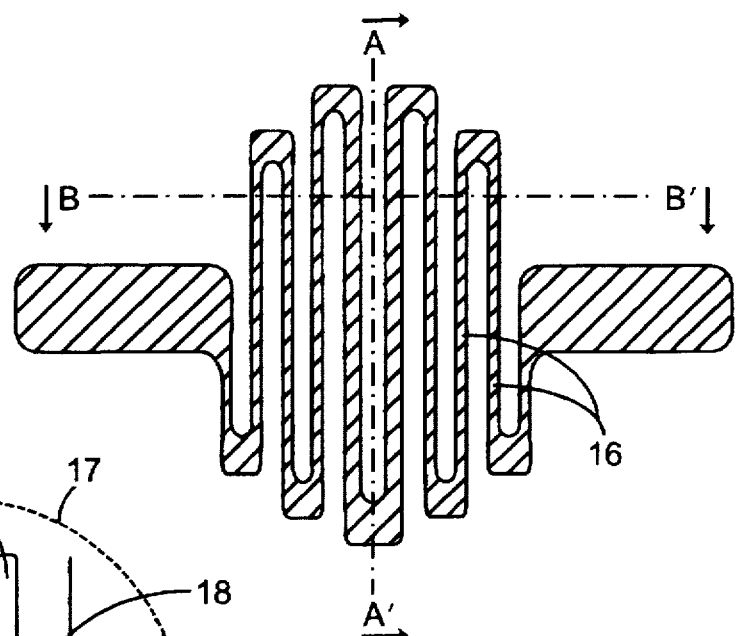
FIG. 6 shows an exemplary embodiment of the design of the resistive track of a PTC thermistor of a current limiter circuit according to FIGS. 3–5.
Figure 6B:
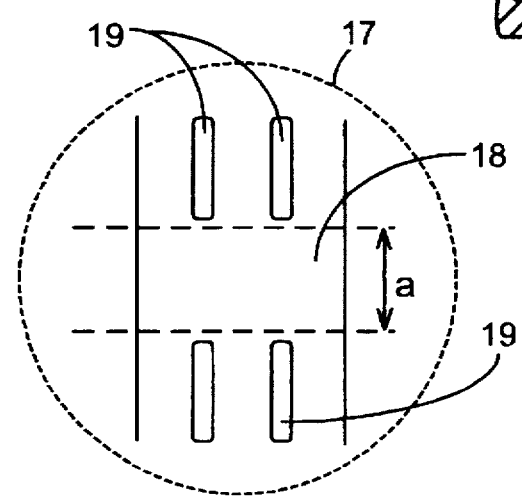

FIG. 6 shows the shape of a resistive track of a non blocking PTC thermistor (5), which is designed in its central part with meandering shape and symmetrically relative to a section plane (A–A').

The starting base is a metal sheet which is structured with meandering shape in the central part by means of a conventional cutting method such as, for example, water-jet cutting or laser cutting, or using a photolithography process. To achieve a uniform current distribution in the case of inhomogeneities (hot points), meandering tracks (16) which form the resistor are subdivided in their longitudinal direction, at least once but preferably many times, by mutually parallel elongate gaps (19), cf. the detailed representation of a meandering track (16) in a detail (17). Between longitudinally sequential gaps (19), gap-free cooling islands (18) with a predeterminable lengthwise separation (a) are provided, which allow an increased rated current carrying capacity without repercussions on the dynamic response under short circuit conditions. With increasing mutual lengthwise separation (a) of the individual gaps (19), the rated current carrying capacity can be improved further. Further cooling islands (18') are provided at the end on the meandering tracks (16).

By folding the structured metal sheet through 180° about the section plane (A–A'), a particularly low-inductance structure with symmetrical routing of the current in both directions is achieved.

As the starting basis of the non blocking PTC thermistor (5) a preferably ferro magnetic metal or metal alloy may be used. Materials based on nickel, iron or cobalt and their alloys are particularly suitable. The positive temperature coefficient of resistivity of these materials, which is particularly high compared to nonferromagnetic pure metals, has a non linear response which is beneficial for the application, with a maximum in the Curie temperature region. In principle, however, non ferro magnetic metals such as beryllium or ruthenium, with a temperature coefficient of resistance of $>4 \cdot 10^{-3}$ $K^{-1}$ may also be used.

Instead of a structured metal sheet, it is also possible to use a layer of the abovedescribed material composition, produced by means of a chemical or electrochemical process.

The required dynamic response of the PTC thermistor (5) under short circuit conditions is achieved by forming a small cross-sectional area of the active part. Typical values for the cross-sectional area are, for a circuit according to FIGS. 1 and 2, in the range of from 0.1 $mm^2$ to 5 $mm^2$, preferably in the range of from 0.5 $mm^2$ to 1.5 $mm^2$. The cold resistances at room temperature are in the range of from a few 10Ω–100 mΩ.

Figure 7:
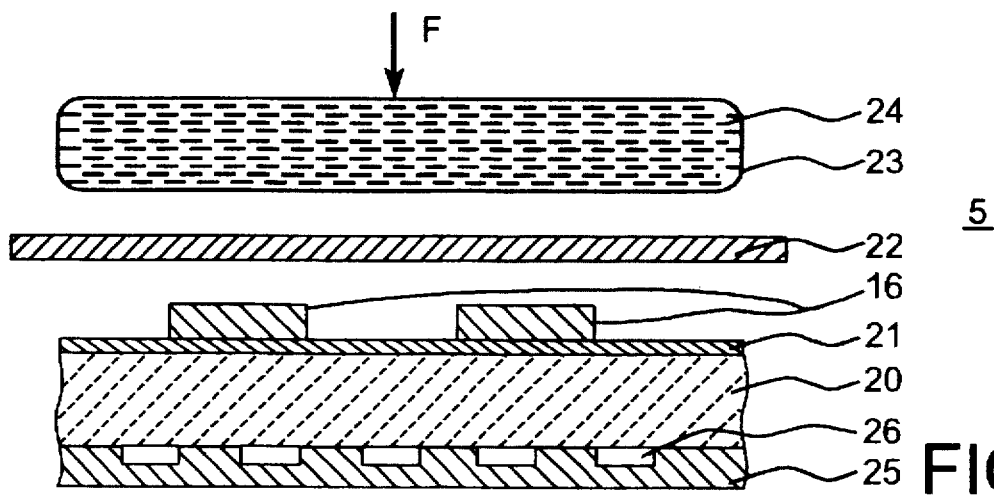
FIG. 7 shows the construction scheme of a PTC thermistor, which can be ungrounded, having an industrial-water cooling system for high electrical powers.

FIG. 7 shows the construction scheme of a non blocking PTC thermistor (5) having a resistive track as represented, in FIG. 6, in exploded representation. The representation is a cross section on a section plane (B–B') in FIG. 6 orthogonal to the section plane (A–A'). An electrically insulating, thermally conductive insulation or ceramic layer (20), for example made of AlN or BN or $Al_2O_3$, is in contact electrically and with good thermal conduction via a first main surface with a metallic cooling element (25). The cooling element (25) has, adjoining the first main surface of the ceramic layer (20), cooling slots (26) through which preferably turbulent electrically conductive water (industrial water) flows during operation. A second main surface of the ceramic layer (20), opposite the first main surface, is covered with an electrically insulating thermal-conduction layer (21), for example of oil or a siliconebased heat-transfer compound, having a thickness in the range of from 10 µm–100 µm. Meandering tracks (16) of the resistive body of the PTC thermistor (5) (cf. FIG. 6) are pressed between this thermal-conduction layer (21) and an electrically insulating, preferably thermally conductive, flexible high-temperature stable polymer film (22), for example made of a silicone elastomer, with a thickness in the range of from 0.2 mm–10 mm, preferably in the range of from 1 mm–5 mm. In order to provide pressure, a pressure compensation cushion or pressure compensation element (23), on which a force (F) orthogonal to the second main surface of the ceramic layer (20) acts, may be provided. The pressure compensation element (23) may, for example, consist of a thin, flexible metal sheet which is welded to form a closed shell and has a thickness in the range of 0.2 cm–3 cm. The pressure compensation element (23) is filled with a dielectric or electrically conductive fluid (24) having a boiling temperature preferably above 150° C. Carboxylate esters, polyalcohol esters, polymeric dimethylsiloxanes or aliphatic pentaerythritol esters may be used, for example, as high-boiling fluids (24). In order to increase the rated current carrying capacity, it is optionally possible to bring a further heat sink (not represented) into direct contact with the pressure compensation element (23). The pressure compensation element (23) provides, on the one hand, uniform pressing of the resistive tracks (16) onto the ceramic layer (20) and, on the other hand, compensation cooling by convection in order to protect the resistive tracks (16) from partial overheating.

The pressure compensation element (23) can, be left out whenever the high-temperature stable polymer film (22) consists of silicone elastomer or of another elastomer material, having a thickness in the range of 1.5 mm–10 mm and a Shore hardness in the range of 10 Shore A–100 Shore A.

Figure 8:
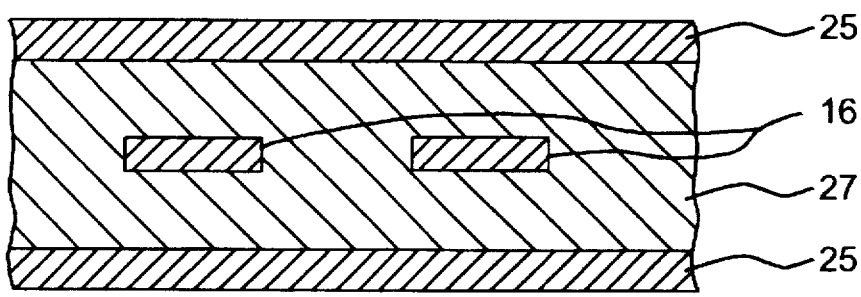
FIG. 8 shows the construction scheme of a PTC thermistor that is particularly easy to assemble.

FIG. 8 shows the structure of a PTC thermistor (5), which is particularly simple to set up, in detail in cross section. The resistive or meandering tracks (16) of the PTC thermistor (5) are here integrated or embedded in a polymer matrix (27) filled with inorganic, thermally conductive particles such as, for example, AlN, BN or $Al_2O_3$. The polymer matrix (27) consists of high-temperature duromers and/or elastomers and/or high-temperature thermo-plastics. The polymer matrix (27) preferably consists of polyether ether ketones (PEEK) and/or polyether imides (PEI) and/or polysulfones (PSU) and/or polyether sulfones (PES). A bimodally distributed powder is preferably used as filler. To increase the thermal conductivity, the in general maximum achieved filling ratio of 62 vol % cf. the previously mentioned paper by P. Bujard and J. P. Ansermet, can thereby be increased further. The elastic properties of the polymer matrix (27) allow good thermal contact with its peripheral metallic heat sinks or cooling elements (25) which are preferably cooled by a mixture of water and glycol.

Figure 9:
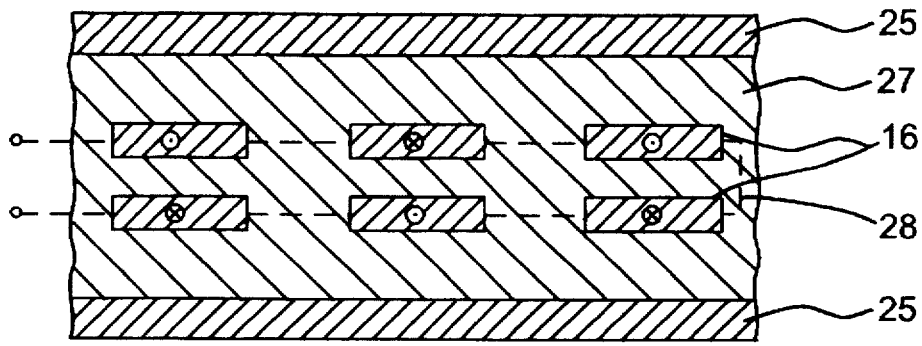
FIGS. 9 and 10 show the construction scheme of PTC thermistors having a particularly low inductance.
Figure 10:
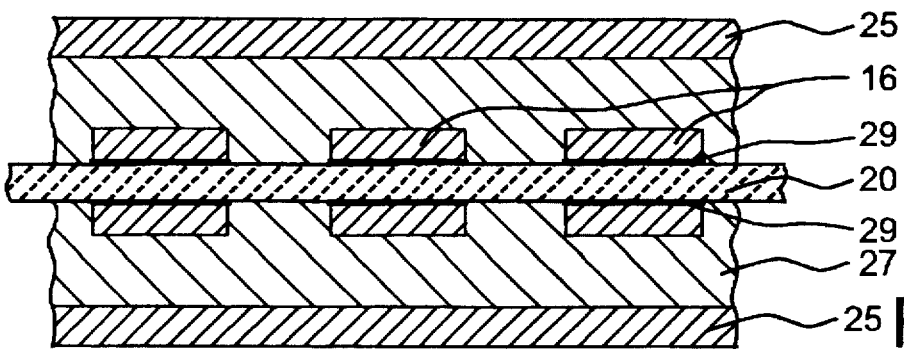

FIGS. 9 and 10 show particularly low-induction PTC thermistors (5) in detail in cross section. At least approximately geometrically congruent resistive or meandering tracks (16), through which an electric current is fed in antiparallel, are embedded in the polymer matrix (27). An electrical line (28), which electrically connects the meandering tracks (16) at the end in such a way that current flows through neighboring meandering tracks (16) in an antiparallel direction, is shown in broken lines.

In the case of a PTC thermistor (5) embodiment according to FIG. 10, a Cr/Ni layer, approximately 1 μm thick, is applied as bonding layer (29) onto the meandering tracks (16) on one or both sides. A nickel or iron layer is applied onto this bonding layer (29) by an electrolytic chemical process or a soldering process. When iron is used, a nickel or aluminum layer can be applied as corrosion protection in a second step. Via this layer (29), the meandering tracks (16) are in contact electrically and with good thermal conduction with a ceramic layer (20), every two meandering tracks (16) being opposite each other on the ceramic layer (20) with at least approximate geometrical congruence. As in the case of FIG. 9, the ceramic layer (20) and the meandering tracks (16) of the PTC thermistor (5) are embedded in a polymer matrix (27) and cooled by means of peripheral cooling elements (25), preferably using a mixture of water and glycol.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A current limiter device, comprising:

at least one PTC thermistor in a first circuit branch;

at least one varistor in a second circuit branch electrically connected in parallel with the first circuit branch; and at least one electrical impedance connected in the second circuit branch in series with the at least one varistor, wherein the at least one PTC thermistor has at least one resistive track of a material with a positive temperature coefficient, which is thermally conductively connected to at least one cooling element, the at least one resistive track having a first surface thermally connected by an electrically insulating, thermally conductive insulation layer to the at least one cooling element, and a second surface connected to a flexible high-temperature stable polymer film.

2. The device as claimed in claim 1, wherein one of the at least one electrical impedance in the second circuit branch is an ohmic resistor.

3. The device as claimed in claim 1, further comprising a diode connected in the reverse-bias direction of a short-circuit path in a third circuit branch in parallel with the first circuit branch.

4. The device of claim 3, wherein the first circuit branch has at least two PTC thermistors, at least one of which is a non-blocking PTC thermistor having, on heating, resistance jumps less than 100 times its cold resistance, and at least one of which is a blocking PTC thermistor having, on heating, resistance jumps more than 100 times its cold resistance.

5. The device as claimed in claim 1, wherein the high-temperature stable polymer film consists of an elastomer material having a thickness in the range of 1.5 mm–10 mm.

6. The device of claim 5, wherein the polymer film has a Shore hardness in the range of 10 Shore A–100 Shore A.

7. The device as claimed in claim 1, wherein the at least one resistive track is connected via an electrically insulating thermal-conduction layer to the insulation layer and a pressure compensation element is in pressure contact with the high-temperature stable polymer film which presses the polymer film against the at least one resistive track.

8. The device of claim 7, wherein the thermal conduction layer is a silicone-based heat-transfer compound having a thickness in the range of 10 μm–100 μm.

9. The device as claimed in claim 1, wherein the at least one resistive track is embedded in a polymer matrix.

10. The device as claimed in claim 9, wherein there are at least two resistive tracks which are mutually separated, are at least approximately geometrically congruent, and are embedded in the polymer matrix such that the at least approximately geometrically congruent parts of the resistive tracks are opposite each other, such that, in operation, a current follows through neighboring ones of the at least two resistive tracks in an antiparallel direction.

11. The device as claimed in claim 10, wherein the at least two resistive tracks are separated from each other by an insulation layer.

12. The device of claim 11, wherein the at least two resistive tracks are thermally conductively connected by a Cr/Ni layer to the insulation layer.

13. The device of claim 10, wherein the polymer matrix is filled with inorganic, thermally conductive particles.

14. The device of claim 1, further comprising a pressure-compensation element which provides pressure to the second surface.

15. The device of claim 14, wherein the pressure-compensation element is a metal sheet filled with an electrically conductive fluid having a boiling temperature above 150° C.

* * * * *